United States Patent
Luo et al.

(10) Patent No.: US 12,389,386 B2
(45) Date of Patent: Aug. 12, 2025

(54) METHOD PERFORMED BY USER EQUIPMENT

(71) Applicant: SHARP KABUSHIKI KAISHA, Sakai (JP)

(72) Inventors: Chao Luo, Shanghai (CN); Renmao Liu, Shanghai (CN)

(73) Assignee: SHARP KABUSHIKI KAISHA, Osaka (JP)

( * ) Notice: Subject to any disclaimer, the term of this patent is extended or adjusted under 35 U.S.C. 154(b) by 320 days.

(21) Appl. No.: 17/599,456

(22) PCT Filed: Mar. 25, 2020

(86) PCT No.: PCT/CN2020/081143
§ 371 (c)(1),
(2) Date: Sep. 28, 2021

(87) PCT Pub. No.: WO2020/192695
PCT Pub. Date: Oct. 1, 2020

(65) Prior Publication Data
US 2022/0201710 A1 Jun. 23, 2022

(30) Foreign Application Priority Data
Mar. 28, 2019 (CN) .......................... 201910246454.X (51) Int. Cl.
*H04W 72/02* (2009.01)
*H04W 72/1263* (2023.01)
(Continued)

(52) U.S. Cl.
CPC ....... *H04W 72/1263* (2013.01); *H04W 72/02* (2013.01); *H04W 72/20* (2023.01); *H04W 72/30* (2023.01)

(58) Field of Classification Search
CPC . H04W 72/1263; H04W 72/02; H04W 72/20; H04W 72/30; H04W 72/121;
(Continued)

(56) References Cited

U.S. PATENT DOCUMENTS

2015/0257187 A1   9/2015 Kwon
2016/0248477 A1* 8/2016 Lin .......................... H04B 3/54
(Continued)

FOREIGN PATENT DOCUMENTS

CN   110798297 A   2/2020
EP   3821658        5/2021
(Continued)

OTHER PUBLICATIONS

Xiaomi, "Discussion on physical layer structure for 5G V2X", R1-1911287 3GPP TSG RAN WG1 #98bis, Chongqing, China, Oct. 14-20, 2019.
Apple, "Remaining Details on NR V2X Physical Layer Structure", R1-2000850 3GPP TSG RAN WG1 #100-e, e-Meeting, Feb. 24-Mar. 6, 2020.
(Continued)

*Primary Examiner* — Wei Zhao
(74) *Attorney, Agent, or Firm* — ScienBiziP, P.C.

(57) ABSTRACT

Provided in the present disclosure is a method performed by user equipment, comprising: receiving sidelink control information (SCI); and determining, according to the SCI, a cast-type and/or a session ID of a physical sidelink shared channel (PSSCH) scheduled by the SCI.

2 Claims, 4 Drawing Sheets (51) Int. Cl.
*H04W 72/20* (2023.01)
*H04W 72/30* (2023.01)

(58) Field of Classification Search
CPC .... H04W 24/02; H04L 1/1822; H04L 1/1896; H04L 5/0053; H04L 2001/0093
See application file for complete search history.

(56) References Cited

U.S. PATENT DOCUMENTS

| | | | |
|---|---|---|---|
| 2019/0052436 A1* | 2/2019 | Desai | H04W 72/0446 |
| 2019/0357304 A1 | 11/2019 | Zeng et al. | |
| 2020/0052829 A1* | 2/2020 | Bendlin | H04W 76/11 |
| 2021/0160778 A1 | 5/2021 | Ji | |

FOREIGN PATENT DOCUMENTS

| | | |
|---|---|---|
| WO | 2018/027996 A1 | 2/2018 |
| WO | 2020/033088 A1 | 2/2020 |

OTHER PUBLICATIONS

CATT, "Support of unicast, groupcast and broadcast in NR sidelink", R1-1810539, 3GPP TSG RAN1 Meeting #94bis, Chengdu, China, Oct. 8-12, 2018.
Samsung, "On Physical Layer Procedures for NR V2X", R1-1902274, 3GPP TSG RAN WG1 #96, Athens, Greece, Feb. 25-Mar. 1, 2019.
Samsung, "On Physical Layer Procedures for NR V2X", R1-1906941, 3GPP TSG RAN WG1 #97, Reno, USA, May 13-17, 2019.
Samsung, "On Physical Layer Procedures for NR V2X", R1-1904426, 3GPP TSG RAN WG1 #96bis, Xi'an, China, Apr. 8-12, 2019.
LG Electronics, "Discussion on physical layer structure for NR sidelink", R1-1907012, 3GPP TSG RAN WG1 #97, Reno, USA, May 13-17, 2019.
NTT Docomo, Inc., "New WID on New Radio Access Technology", RP-170855, 3GPP TSG RAN Meeting #75, Dubrovnik, Croatia, Mar. 6-9, 2017.
Vodafone, "New SID: Study on NR V2X", RP-181429, 3GPP TSG RAN Meeting #80, La Jolla, USA, Jun. 11-14, 2018.

* cited by examiner

METHOD PERFORMED BY USER EQUIPMENT

TECHNICAL FIELD

The present disclosure relates to the technical field of wireless communications, and in particular to a method performed by user equipment, a method performed by a base station, and corresponding user equipment.

BACKGROUND

Vehicle-to-Everything (V2X) communication refers to communication between a vehicle and any entity that may affect the vehicle. Typical V2X communication includes Vehicle-to-Infrastructure (V2I), Vehicle-to-Network (V2N), Vehicle-to-Vehicle (V2V), Vehicle to Pedestrian (V2P), etc.

3GPP's LIE standards started to support V2V communications from Rel-14, and support V2X communications from Rel-15. In 3GPP standard specifications, an interface between UEs for implementing D2D discovery and D2D communication is referred to as PC5, which is also referred to as "direct link" or "sidelink (abbreviated as SL)" at the physical layer, so as to be distinguished from uplink (abbreviated as UL) and downlink (abbreviated as DL).

As 5G NR (see Non-Patent Document 1, hereinafter referred to as 5G, or NR, or Rel-15 NR, or Rel-15 5G) standardization work progresses, and the 3GPP has identified more advanced V2X service (eV2X service) demands. 3GPP V2X Phase 3, i.e., NR V2X is on the agenda. In June 2018, a new research project (see Non-Patent Document 2, hereinafter abbreviated as NR V2X research project, or V2X Phase 3 research project) on 3GPP NR V2X was approved at the 3GPP RAN #80 plenary session. One of the goals of the NR V2X research project is to study the design of a new system-based SL interface.

In NR V2X, the physical layer of the SL interface supports broadcast, groupcast, and unicast transmission in in-coverage, out-of-coverage, and partial-coverage scenarios.

NR V2X supports an SL synchronization function. Relevant signals and channels include:
- an SL PSS (sidelink primary synchronization signal), also known as S-PSS, or PSSS (primary sidelink synchronization signal);
- an SL SSS (sidelink secondary synchronization signal), also known as S-SSS or SSSS (secondary sidelink synchronization signal); and
- a PSBCH (physical sidelink broadcast channel).

In NR V2X, the SL PSS, SL SSS, and PSBCH are organized into the form of blocks in a time-frequency resource grid, called SL SSBs (sidelink SS/PBCH blocks, sidelink synchronization signal/physical broadcast channel blocks), or S-SSBs. The transmission bandwidth of the SL SSBs is within an St. BWP (sidelink bandwidth part configured for the UE. The SL PSS and/or SL SSS may carry an SL SSID (sidelink synchronization identity, or sidelink synchronization identifier, or sidelink synchronization signal identity, or sidelink synchronization signal identifier), and the PSBCH may carry an SL MIB (sidelink master information block).

Synchronization sources (sometimes referred to as synchronization references) for NR V2X may include a GNSS (global navigation satellite system), a gNB, an eNB, and an NR UE. The priority definition of the synchronization sources is shown in Table 1, UE uses (pre)configuration information to determine whether to use "GLASS-based synchronization" or "gNB/eNB-based synchronization."

TABLE 1

| | NR V2X synchronization source priority | |
|---|---|---|
| Priority | GNSS-based synchronization | gNB/eNB-based synchronization |
| P0 | GNSS | gNB/eNB |
| P1 | All UE directly synchronized to GNSS | All UE directly synchronized to gNB/eNB |
| P2 | All UE indirectly synchronized to GNSS | All UE indirectly synchronized to gNB/eNB |
| P3 | Any other UE | GNSS |
| P4 | N/A | All UE directly synchronized to GNSS |
| P5 | N/A | All UE indirectly synchronized to GNSS |
| P6 | N/A | Any other UE |

In the out-of-coverage scenario, and in an RRC_IDLE state, one SL BWP (sidelink bandwidth part) may be (pre)configured on one NR V2X carrier. In the in-coverage scenario, there is only one valid (or activated) SL BWP on one NR V2X carrier. One or more resource pools (which refers to a time-frequency resource set that can be used for SL transmission and/or reception) may be (pre)configured on one SL BWP.

The resource allocation manner of NR V2X may be categorized as follows:
- Mode 1: A base station schedules SL resources for SL transmission.
- Mode 2: UE determines the SL resources for SL transmission (that is, the base station does not participate in scheduling of the SL resources). Mode 2 may be subdivided into the following situations:
- In some cases, when the context is clear, for example, when it can be seen from the context that a capability related to PDSCH processing is referred to, the PDSCH processing capability 1 may also be referred to as a UE processing capability 1.
- Other channels involved in NR V2X include at least:
  - a PSSCH (physical sidelink shared channel);
  - a PSCCH (physical sidelink control channel); and
  - a PSCCH (physical sidelink feedback channel).

Ln IR V2X, UE schedules transmission of data carried by a PSSCH by using SCI (sidelink control information) carried by a PSCCH. Depending on factors such as which of unicast or groupcast or broadcast transmission is being scheduled, and whether HARQ feedback is required, the SCI may include one or a plurality of the following:
- a layer-1 source identifier (layer-1 source ID), or a physical layer source identifier (physical layer source ID);
- a layer-1 destination identifier (layer-1 destination ID), or a physical layer target identifier (physical layer source ID);

an HARQ process identifier (HARQ process ID), or an HARQ process number;
a new data indicator (NM); and
a redundancy version (RV).

In V2X (Rel-16), potential problems of the SL design include at least:
the possibility of collision of UE IDs and collision in resource reservation;
poor transport block HARQ combining performance;
poor flexibility of resource allocation and reservation and low resource configuration efficiency; and
unnecessary HARQ feedback retransmission in groupcast communication.

PRIOR ART DOCUMENT

Non-Patent Documents

Non-Patent Document 1: RP-170855, New WID on New Radio Access Technology
Non-Patent Document 2: RP-181429, New SID: Study on NR V2X

SUMMARY OF INVENTION

In order to solve at least some of the aforementioned problems, the present disclosure provides a method performed by user equipment, and user equipment, which can mitigate or eliminate the problems of the possibility of collision of UE IDs and collision in resource reservation, improve the HARQ combining performance of transport blocks, enhance the flexibility of resource allocation and reservation, and increase the resource configuration efficiency.

According to one aspect of the present disclosure, provided is a method performed by user equipment, including: receiving sidelink control information (SCI); and determining, according to the SCI, a cast-type and/or a session ID of a physical sidelink shared channel (PSSCH) scheduled by the SCI.

In the method performed by user equipment according to one aspect of the present disclosure, the SCI includes any one or a plurality of the following: a first indication, indicating that the PSSCH scheduled by the SCI belongs to unicast/groupcast; a second indication, indicating that the PSSCH scheduled by the SCI belongs to unicast/broadcast; a third indication, indicating that the PSSCH scheduled by the SCI belongs to groupcast/broadcast, a fourth indication, indicating that the PSSCH scheduled by the SCI belongs to unicast/groupcast/broadcast; and a fifth indication, indicating the session ID corresponding to the PSSCH scheduled by the SCI.

In the method performed by user equipment according to one aspect of the present disclosure, the first indication, the second indication, and the third indication are indicated by using a one-bit field, or a part of bits of a field having more than one bit, or different value ranges of a field in the SCI, the fourth indication is indicated by using a two-bit field, or a part of bits of a field having more than two bits, or different value ranges of a field in the SCI, and the fifth indication is indicated by using the same field or different fields.

In the method performed by user equipment according to one aspect of the present disclosure, regarding the cast-type, in a case where the SCI includes the first indication, the PSSCH belongs to unicast/groupcast; in a case where the SCI includes the second indication, the PSSCH belongs to unicast/broadcast; in a case where the SCI includes the third indication, the PSSCH belongs to groupcast/broadcast; in a case where the SCI includes the fourth indication, the PSSCH belongs to unicast/groupcast/broadcast. In addition, according to another aspect of the present disclosure, further provided is a method performed by user equipment, including: acquiring a higher layer UE ID, namely, $ID_2$; and mapping the higher layer UE ID to a physical layer UE ID, namely, $ID_1$.

In the method performed by user equipment according to another aspect of the present disclosure, the higher layer is a protocol layer or a protocol sublayer above a physical layer.

In the method performed by user equipment according to another aspect of the present disclosure, the higher layer UE ID is a UE ID used by a specific protocol layer or protocol sublayer, or a UE ID used collectively by a plurality of protocol layers and/or protocol sublayers; or the higher layer UE ID is indicated by a protocol layer or protocol sublayer of the UE, to another protocol layer or protocol sublayer; or the higher layer UE ID is indicated by using an RRC message or a PC5 RRC message, or indicated by using a MAC CE, or indicated by using DCI, or indicated by using SCI; or the higher layer UE ID is an integer of even bits that are 8 or more and 64 or less bits.

In the method performed by user equipment according to another aspect of the present disclosure, the physical layer UE ID is a layer-1 UE ID; or the physical layer UE ID is an integer of even bits that are 2 or more and 24 or less bits.

In the method performed by user equipment according to another aspect of the present disclosure, for any one of unicast, groupcast, and broadcast, the mapping manner is any one of the following expressions (1) to (6):

$$ID_1 = x_1 + \left\lfloor \frac{y_1 - x_1}{y_2 - x_2} \cdot n_2 \right\rfloor \quad (1)$$

$$ID_1 = \left\lfloor x_1 + \frac{y_1 - x_1}{y_2 - x_2} \cdot n_2 \right\rfloor \quad (2)$$

$$ID_1 = x_1 + \frac{y_1 - x_1}{y_2 - x_2} \cdot n_2 \quad (3)$$

$$ID_1 = x_1 + \left\lceil \frac{y_1 - x_1}{y_2 - x_2} \cdot n_2 \right\rceil \quad (4)$$

$$ID_1 = \left\lceil x_1 + \frac{y_1 - x_1}{y_2 - x_2} \cdot n_2 \right\rceil \quad (5)$$

$$ID_1 \in A \quad (6)$$

where:
$y_1$ is a maximum value of $ID_1$, $x_1$ is a minimum value of $ID_1$, that is, the value range of is $[x_1, y_1]$;
$n_2$ is equal to $ID_2$, or equal to an integer value corresponding to a part of bits of $ID_2$;
$y_2$ is a maximum value of $n_2$, $x_2$ is a minimum value of $n_2$, that is, the value range of $n_2$ is $[x_2, y_2]$;
A is an integer set including one or more integers.

In the method performed by user equipment according to another aspect of the present disclosure, any one of $x_1$, $y_1$, $x_2$, $y_2$, and A is: a predefined value; or a pre-configured value; or indicated by using an RRC message or a PC5 RRC message; or indicated by using a MAC CE, or indicated by using DCI, or indicated by using SCI.

In addition, according to another aspect of the present disclosure, provided is user equipment, including: a processor; and a memory storing instructions, wherein the instructions, when run by the processor, perform the above method.

Effect of Invention

According to the present disclosure, it is possible to provide a method performed by user equipment and user equipment for mitigating or eliminating the problems of the possibility of collision of UE IDs and collision in resource reservation, improving the transport block HARQ combining performance, enhancing the flexibility in resource allocation and reservation, and increasing the resource configuration efficiency.

BRIEF DESCRIPTION OF THE DRAWINGS

The above and other features of the present disclosure will become more apparent with the following detailed description in conjunction with the accompanying drawings.

DETAILED DESCRIPTION

The following describes the present disclosure in detail with reference to the accompanying drawings and specific embodiments. It should be noted that the present disclosure should not be limited to the specific embodiments described below. In addition, for simplicity, detailed description of the prior art not directly related to the present disclosure is omitted to prevent confusion in understanding the present disclosure.

A plurality of embodiments according to the present disclosure are described in detail below by using a 5G mobile communication system and its subsequent evolved versions as an exemplary application environment. However, it is to be noted that the present invention is not limited to the following embodiments, and rather, it is applicable to many other wireless communication systems, such as a communication system later than 5G and a 4G mobile communication system earlier than the 5G.

Some terms related to the present disclosure are described below. If not specifically indicated, the terms related to the present disclosure use the definitions herein. The terms given in the present disclosure may be named differently in LTE, LTE-Advanced, LTE-Advanced Pro, NR, and later communication systems, but unified terms are used in the present disclosure. When applied to a specific system, the terms may be replaced with terms used in the corresponding system.

3GPP: 3rd Generation Partnership Project
AS: Access Stratum
BWP: Bandwidth Part
CA: Carrier Aggregation
CCE: Control Channel Element
CORESET: Control Resource Set
CP: Cyclic Prefix
CP-OFDM: Cyclic Prefix Orthogonal Frequency Division Multiplexing
CRB: Common Resource Block
CRC: Cyclic Redundancy Check
CSS: Common Search Space
DC: Dual Connectivity
DCI: Downlink Control Information
DFT-s-OFDM: Discrete Fourier Transformation Spread Orthogonal Frequency Division Multiplexing
DL: Downlink
DL-SCH: Downlink Shared Channel
DM-RS: Demodulation Reference Signal
eMBB: Enhanced Mobile Broadband, enhanced mobile broadband communication
FDRA: Frequency Domain Resource Assignment
FR1: Frequency Range 1
FR2: Frequency Range 2
HARQ: Hybrid Automatic Repeat Request
IE: Information Element
IP: Internet Protocol
LCID: Logical Channel ID, Logical Channel Identity
LTE-A: Long Term Evolution-Advanced
MAC: Medium Access Control
MAC CE: MAC Control Element
MCG: Master Cell Group
MIB: Master Information Block
mMTC: Massive Machine Type Communication
NAS: Non-Access Stratum
NR: New Radio
NUL: Normal Uplink
OFDM: Orthogonal Frequency Division Multiplexing
PBCH: Physical Broadcast Channel
PDCCH: Physical Downlink Control Channel
PDCP: Packet Data Convergence Protocol
PDSCH: Physical Downlink Shared Channel
PSBCH: Physical Sidelink Broadcast Channel
PDCCH: Physical Sidelink Control Channel
PSSCH: Physical Sidelink Shared Channel
PRB: Physical Resource Block
PSS: Primary Synchronization Signal
PSSS: Primary Sidelink Synchronization Signal
PTAG: Primary Timing Advance Group
PUSCH: Physical Uplink Shared Channel
PUCCH: Physical Uplink Control Channel
QCL: Quasi Co-Location
RAR: Random Access Response
RB: Resource Block
RE: Resource Element
REG: Resource-Element Group
RE Radio Frequency
RLC: Radio Link Control
RNTI: Radio Network Temporary Identifier
RRC: Radio Resource Control
SCG: Secondary Cell Group
SCI: Sidelink Control Information
SCS: Subcarrier Spacing
SDAP: Service Data Adaptation Protocol SFN: System Frame Number
SIB: System Information Block
SL: Sidelink
SL BWP: Sidelink Bandwidth Part
SL PSS: Sidelink Primary Synchronization Signal
SL SSB: Sidelink SS/PBCH Block, Sidelink Synchronization Signal/Physical Broadcast Channel Block
SL SSS: Sidelink Secondary Synchronization Signal
SpCell: Special Cell
SRS: Sounding Reference Signal
SSB: Synchronization Signal/Physical Broadcast Channel (SS/PBCH) Block
SSS: Secondary Synchronization Signal
SSSS: Secondary Sidelink Synchronization Signal
STAG: Secondary Timing Advance Group
SUL: Supplementary Uplink
TA: Timing Advance
TAG: Timing Advance Group
TCP: Transmission Control Protocol
TDD: Time Division Duplexing
TPC: Transmit Power Control
EYE: User Equipment
UL: Uplink
URLLC: Ultra-Reliable and Low Latency Communication
USS: UE-specific Search Space
V2I: Vehicle-to-Infrastructure
V2N: Vehicle-to-Network
V2P: Vehicle-to-Pedestrian
V2V: Vehicle-to-Vehicle
V2X: Vehicle-to-Everything Embodiment 1

A method performed by user equipment according to Embodiment 1 of the present disclosure will be described below with reference to FIG. 1.

Figure 1:
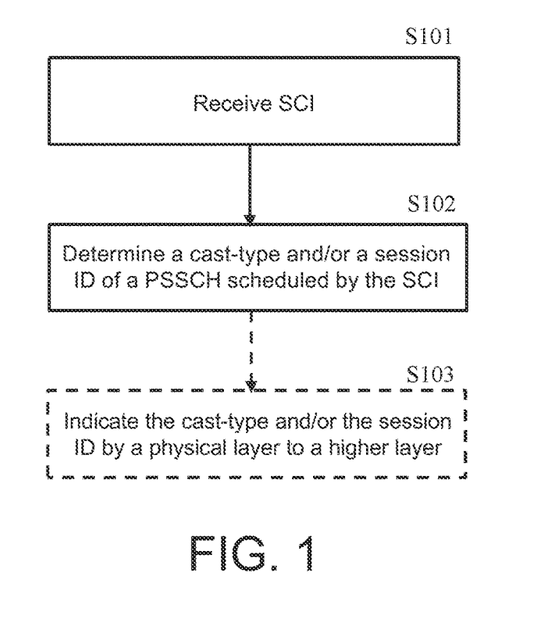
FIG. 1 is a flowchart showing a method performed by user equipment according to Embodiment 1 of the present disclosure.

FIG. 1 is a flowchart showing a method performed by user equipment according to Embodiment 1 of the present disclosure.

As shown in FIG. 1, in Embodiment 1 of the present disclosure, steps performed by the user equipment (UE) include: steps S101 and S102, Optionally, the method may further include step S103 (a dashed line indicates "optional" in FIG. 1).

Specifically, at step S101, sidelink control information (SCI) is received.

The SCI may include one or a plurality of the following:

Unicast/groupcast indication. For example, the indication is used to indicate whether a PSSCH scheduled by the SCI belongs to unicast or groupcast, which is, for example, indicated by using a one-bit field in the SCI, or indicated by using a part of bits of a field having more than one bit, or indicated by using different value ranges of a field (for example, a part of values of an HARQ process number or layer-1 UE ID indicate unicast, and another part of values indicate groupcast).

Unicast/broadcast indication. For example, the indication is used to indicate whether the PSSCH scheduled by the SCI belongs to unicast or broadcast, which is, for example, indicated by using a one-bit field in the SCI, or indicated by using a part of bits of a field having more than one bit, or indicated by using different value ranges of a field (for example, a part of values of the HARQ process number or layer-1 UE ID indicate unicast, and another part of values indicate broadcast).

Groupcast/broadcast indication. For example, the indication is used to indicate whether the PSSCH scheduled by the SCI belongs to groupcast or broadcast, which is, for example, indicated by using a one-bit field in the SCI, or indicated by using a part of bits of a field having more than one bit, or indicated by using different value ranges of a field (for example, a part of values of the HARQ process number or layer-1 UE ID indicate groupcast, and another part of values indicate broadcast).

Unicast/groupcast/broadcast indication. For example, the indication is used to indicate whether the PSSCH scheduled by the SCI belongs to unicast, groupcast, or broadcast, which is, for example, indicated by using a two-bit field in the SCI, or indicated by using a part of bits of a field having more than two bits, or indicated by using different value ranges of a field (for example, a part of values of the HARQ process number or layer-1 UE ID indicate unicast, another part of values indicate groupcast, and still another part of values indicate broadcast).

Indication of session ID (session identity, or session identifier). For example, if the PSSCH scheduled by the SCI belongs to unicast, the session ID indicates an ID of a unicast session. As another example, if the PSSCH scheduled by the SCI belongs to groupcast, the session ID indicates an ID of a groupcast session. As another example, if the PSSCH scheduled by the SCI belongs to broadcast, the session ID indicates an ID of a broadcast session. Optionally, if applicable, the session ID and the unicast/groupcast indication (or the unicast/broadcast indication, or the groupcast/broadcast indication, or the unicast/groupcast/broadcast indication) may be indicated by using the same field, or may be indicated separately by using different fields.

In addition, at step S102, one or a plurality of the following is/are determined according to the SCI:
  a cast-type of the PSSCH scheduled by the SCI, that is, whether the PSSCH belongs to unicast or groupcast, or whether the PSSCH belongs to unicast or broadcast, or whether the PSSCH belongs to groupcast or broadcast, or whether the PSSCH belongs to unicast, groupcast, or broadcast; and
  a session ID corresponding to the PSSCH scheduled by the SCI, for example, a unicast session ID, a groupcast session ID, or a broadcast session ID.

In addition, optionally, at step S103, the cast-type and/or the session ID are indicated (or reported) by a physical layer to a higher layer (for example, a MAC sublayer).

In this way, Embodiment 1 of the present disclosure indicates the cast-type of the PSSCH in the SCI, so that different cast-types can use independent UE ID spaces, greatly reducing the possibility of UE ID collisions. Additionally, in a case where HARQ feedback is configured, a receiver UE can explicitly distinguish between a unicast transmission and a groupcast transmission, avoiding HARQ combining of received transport blocks for unicast and transport blocks for groupcast, ensuring the performance of HARQ combining. Finally, Embodiment 1 of the present disclosure indicates the session type of the PSSCH in the SCI, so that a higher layer protocol can simultaneously initiate a plurality of unicast sessions, or a plurality of groupcast sessions, or a plurality of broadcast sessions (where the broadcast session may carry information of a unicast session of the higher layer protocol), improving the flexibility in designing the higher layer protocol (including an application layer protocol).

Embodiment 2

A method performed by user equipment in Embodiment 2 of the present disclosure will be described below with reference to FIG. 2.

Figure 2:
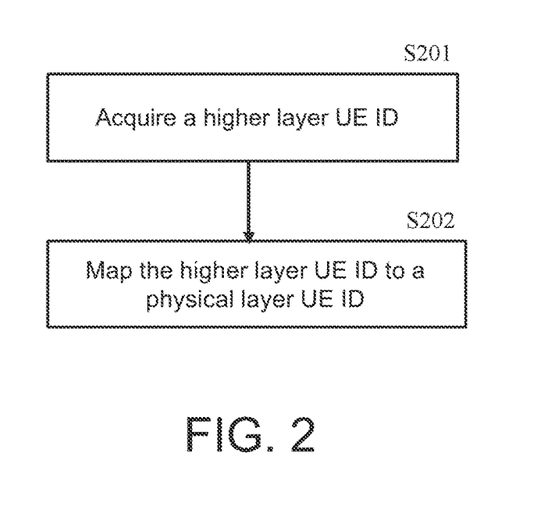
FIG. 2 is a flowchart showing a method performed by user equipment according to Embodiment 2 of the present disclosure.

FIG. 2 is a flowchart showing a method performed by user equipment according to Embodiment 2 of the present disclosure.

As shown in FIG. 2, in Embodiment 2 of the present disclosure, steps performed by the user equipment (UE) include: step S201 and step S202.

Specifically, at step S201, a higher layer UE ID (denoted as $ID_2$) is acquired.

Where:

Optionally, the higher layer (or upper layer) may refer to a protocol layer or a protocol sublayer above a physical layer (excluding the physical layer), for example a MAC sublayer, an RLC sublayer, a PDCP sublayer, a SDAP sublayer, an RRC layer, an AS layer, a NAS layer, a V2X layer, or an application layer.

Optionally, the higher layer UE ID may refer to a UE ID used by a specific protocol layer or protocol sublayer, or may refer to a UE ID collectively used by a plurality of protocol layers and/or protocol sublayers. For example, the higher layer UE ID may be a layer-2 UE ID (or briefly referred to as a layer-2 ID), and the layer-2 UE ID may be used by one or a plurality of a MAC sublayer, an RLC sublayer, a PDCP sublayer, or a SDAP sublayer.

Optionally, the higher layer UE ID may be indicated by a protocol layer or a protocol sublayer of the UE (for example, an RRC layer, an AS layer, a NAS layer, a V2X layer, an application layer, a physical layer, a MAC sublayer, an RLC sublayer, a PDCP sublayer, a SDAP sublayer, or other protocol layer, where applicable) to another protocol layer or protocol sublayer (for example, an RRC layer, an AS layer, a NAS layer, a V2X layer, an application layer, a physical layer, a MAC sublayer, an RLC sublayer, a PDCP sublayer, an SDAP sublayer, or other protocol layer, where applicable).

Optionally, the higher layer UE ID may be indicated by using an RRC message or a PC5 RRC message (for example, an MIB, an SIB, an SL MIB, other RRC message, or other PC5 RRC message), or indicated by using a MAC CE, or indicated by using DCI, or indicated by using SCI, or indicated in other manners.

Optionally, the higher layer UE ID may be an integer, for example, an 8-bit integer, a 10-bit integer, a 12-bit integer, a 14-bit integer, a 16-bit integer, a 18-bit integer, a 20-bit integer, a 22-bit integer, a 24-bit integer, a 26-bit integer, a 28-bit integer, a 30-bit integer, a 32-bit integer, a 34-bit integer, a 36-bit integer, a 38-bit integer, a 40-bit integer, a 42-bit integer, a 44-bit integer, a 46-bit integer, a 48-bit integer, a 50-bit integer, a 52-bit integer, a 54-bit integer, a 56-bit integer, a 58-bit integer, a 60-bit integer, a 62-bit integer, or a 64-bit integer. Furthermore, at step S202, the higher layer UE ID is mapped to a physical layer UE ID (denoted $ID_1$). Where:

Optionally, the physical layer UE ID may also be referred to as a layer-1 UE ID, or a layer-1 ID.

Optionally, the physical layer UE ID may be an integer, for example, a 2-bit integer, a 4-bit integer, a 6-bit integer, an S-bit integer, a 10-bit integer, a 12-bit integer, a 14-bit integer, a 16-bit integer, an 18-bit integer, a 20-bit integer, or a 24-bit integer.

Optionally, for any one of unicast, groupcast, and broadcast, the mapping manner may be any one of the following:

$$ID_1 = x_1 + \left\lfloor \frac{y_1 - x_1}{y_2 - x_2} \cdot n_2 \right\rfloor$$

$$ID_1 = \left\lfloor x_1 + \frac{y_1 - x_1}{y_2 - x_2} \cdot n_2 \right\rfloor$$

$$ID_1 = x_1 + \frac{y_1 - x_1}{y_2 - x_2} \cdot n_2$$

$$ID_1 = x_1 + \left\lceil \frac{y_1 - x_1}{y_2 - x_2} \cdot n_2 \right\rceil$$

$$ID_1 = \left\lceil x_1 + \frac{y_1 - x_1}{y_2 - x_2} \cdot n_2 \right\rceil$$

$$ID_1 \in A$$

where:

$y_1$ is a maximum value of $ID_1$, $x_1$ is a minimum value of $ID_1$, that is, the value range of $ID_1$ is $[x_1, y_1]$.

$n_2$ may be equal to $ID_2$.

$n_2$ may also be equal to an integer value corresponding to a part of bits of $ID_2$ (for example, the lowest 6 bits, the lowest 8 bits, the lowest 10 bits, the lowest 12 bits, the lowest 14 bits, the lowest 16 bits, the highest 6 bits, the highest 8 bits, the highest 10 bits, the highest 12 bits, the highest 14 bits, the highest 16 bits, or a part of bits of $ID_2$ determined in other manners).

$y_2$ is a maximum value of $n_2$, $x_2$ is a minimum value of $n_2$, that is, the value range of $n_2$ is $[x_2, y_2]$.

A is an integer set including one or more integers.

Any one of $x_1$, $y_1$, $x_2$, $y_2$, and A may be a predefined value, or may be a pre-configured value, or may be indicated by using an RRC message or a PC5 RRC message (for example, an MIB, an SIB, an SL MIB, other RRC message, or other PC5 RRC message), or indicated by using a MAC CE, or indicated by using DCI, or indicated by using SCI, or indicated in other manners.

For example, for unicast and groupcast, $$ID_1 = x_1 + \left\lfloor \frac{y_1 - x_1}{y_2 - x_2} \cdot n_2 \right\rfloor,$$

$n_2$ is equal to an integer value corresponding to the lowest 8 bits of $ID_2$;

for unicast, $x_1=0$, $y_1=127$, $x_2=0$, and $y_2=255$;

for groupcast, $x_1=128$, $y_1=254$, $x_2=0$, and $y_2=255$;

for broadcast, $ID_1 \in A$, where $A=\{255\}$.

In this way, Embodiment 2 of the present disclosure properly maps the higher layer UE ID to different value ranges of a layer-1 UE ID space, so that layer-1 UE IDs for unicast, groupcast, and broadcast have no conflict with each other, greatly simplifying a demultiplexing operation of a receiver UE on a received PSSCH, and also avoiding HARQ combining of received transport blocks for unicast and transport blocks for groupcast, ensuring the performance of HARQ combining.

Embodiment 3

A method performed by user equipment in Embodiment 3 of the present disclosure will be described below with reference to FIG. 3.

Figure 3:
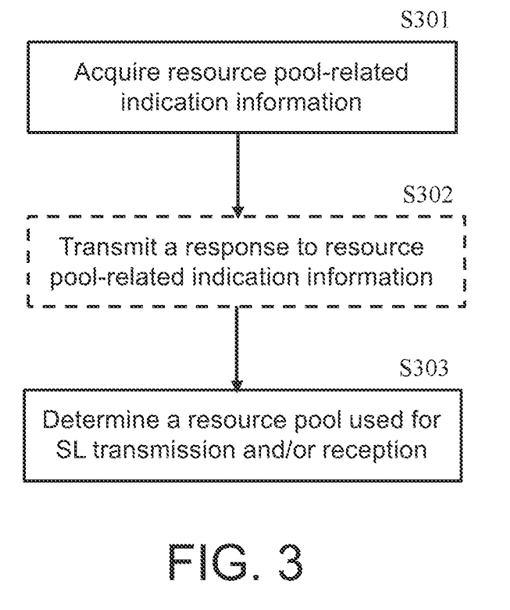
FIG. 3 is a flowchart showing a method performed by user equipment according to Embodiment 3 of the present disclosure.

FIG. 3 is a flowchart showing a method performed by user equipment according to Embodiment 3 of the present disclosure.

As shown in FIG. 3, in Embodiment 3 of the present disclosure, steps performed by the user equipment (UE) include: step S301 and step S303. Optionally, the method may further include step S302 (a dashed line indicates "optional" in FIG. 3).

Specifically, at step S301, resource pool-related indication information is acquired.

Where:

Optionally, the resource pool-related indication information may be from predefined information, or may be from pre-configuration information of the UE, or may be from default configuration information of the UE, or may be from a base station (for example, a gNB, or an eNB), or may be from another UE.

Optionally, the resource pool-related indication information may indicate information of one or more resource pools. The information of each resource pool may include one or a plurality of the following:

a resource pool index, where the resource pool index may be an integer (for example, 0, 1, 2, . . . );

a resource pool identity (or a resource pool identifier), where the resource pool identity may be an integer (for example, 0, 1, 2, . . . );

a start time for SL transmission and/or reception performed using the resource pool;

a time pattern for SL transmission and/or reception performed using the resource pool;

a cast-type for SL transmission and/or reception performed using the resource pool, such as one or a plurality of unicast, groupcast, or broadcast; and a physical channel(s) and/or signal(s) for SL transmission and/or reception performed by using the resource pool. For example, the physical channel(s) and/or signal(s) may be one or a plurality of the following:

an SL PSS;

an SL SSS;

a PSSCH;

a PSCCH;

a PSSCH; and a PSFCH.

Optionally, the resource pool-related indication information may be included in an RRC message or a PC5 RRC message (for example, an MIB, an SIB, an SL MIB, pre-configuration information, default configuration information, other RRC message, or other PC5 RRC message), or may be included in a MAC CE, or may be included in downlink control information (DCI), or may be included in sidelink control information (SCI).

Optionally, if the resource pool-related indication information is included in predefined information, or pre-configuration information, or default configuration information, or an MIB, or an SIB, or an SL MIB, then the resource pool indicated by the resource pool-related indication information may also be referred to as an initial resource pool.

In addition, optionally, at step 302, an acknowledgement to the resource pool-related indication information is transmitted.

Where:

Optionally, the acknowledgement may be a positive acknowledgement, or abbreviated as an ACK.

Optionally, the acknowledgement may be a negative acknowledgement, or abbreviated as a NACK, or abbreviated as a NAK.

Optionally, the acknowledgement may be carried in an acknowledgement to PSSCH transmission, for example, when the resource pool-related indication information is included SCI, and the SCI is used for scheduling PSSCH transmission.

Additionally, at step S303, the resource pool used for SL transmission and/or reception is determined according to the resource pool-related indication information, and/or other information.

For example, the resource pool may be a resource pool currently being used (that is, the resource pool-related indication information is ignored).

As another example, the resource pool may be the resource pool indicated by the resource pool-related indication information (or part or all of a plurality of resource pools indicated by the resource pool-related indication information), in which case it may also be considered that "switching" of the resource pool is performed, that is, the resource pool being used is switched to the resource pool indicated by the resource pool-related indication information (or part or all of the plurality of resource pools indicated by the resource pool-related indication information).

In addition, optionally, SL transmission and/or reception is performed by using the determined resource pool. For example, the SL transmission and/or reception is performed by using the determined resource pool according to restrictions on one or a plurality of the start time, the time pattern, the cast-type, and the physical channel and/or signal.

In this way, Embodiment 3 of the present disclosure allows the UE to semi-statically or dynamically switch a resource pool being used during a unicast or groupcast session by using the resource pool-related indication information, greatly improving the flexibility of resource allocation on an SL; in addition, by semi-statically configuring the initial resource pool by using the resource pool-related indication information, different UEs can select the same resource pool to transmit a broadcast message, initiate a unicast or groupcast session, etc., ensuring that each UE can find other UE with which communication is desired.

Embodiment 4

A method performed by user equipment in Embodiment 4 of the present disclosure will be described below with reference to FIG. 4.

Figure 4:
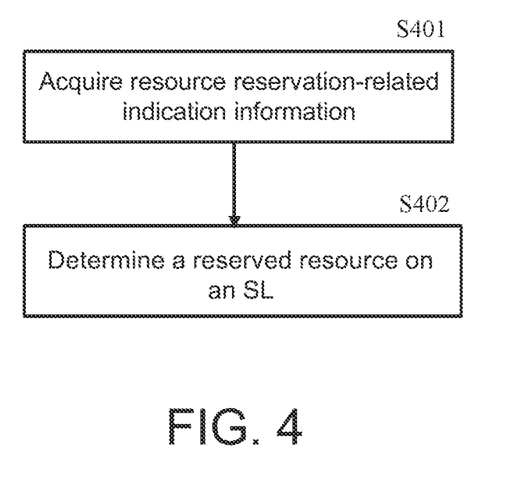
FIG. 4 is a flowchart showing a method performed by user equipment according to Embodiment 4 of the present disclosure.

FIG. 4 is a flowchart showing a method performed by user equipment according to Embodiment 4 of the present disclosure.

As shown in FIG. 4, in Embodiment 4 of the present disclosure, steps performed by the user equipment (UE) include: step S401 and step S402.

Specifically, at step S401, resource reservation-related indication information is acquired.

Where:

Optionally, the resource reservation-related indication information may be from predefined information, or may be from pre-configuration information of the UE, or may be from default configuration information of the UE, or may be from a base station (for example, a gNB, an eNB), or may be from another UE.

Optionally, the resource reservation-related indication information may indicate one or more pieces of resource reservation information. Each piece of resource reservation information may include one or a plurality of the following:

An index of a resource pool where an indicated resource is located. The resourcepool index may be an integer (for example, 0, 1, 2, . . . ).

An identity of a resource pool where the indicated resource is located. The resource pool identity may be an integer (for example, 0, 1, 2, . . . ).

The type of the indicated resource. For example, the type of the indicated resource is any of the following:

a resource reserved for the UE, for example, a resource reserved by a base station for the UE (for example, when the resource reservation-related indication information is from the base station).

a resource reserved for other UE, for example, a resource reserved by the base station for other UE (for example, when the resource reservation-related indication information is from the base station), a resource reserved by UE A for itself (for example, when the resource reservation-related indication information is from the UE A), or a resource reserved by UE A for UE B (for example, when the resource reservation-related indication information is from the UE A);

a resource reserved for the base station, for example, a resource reserved by the base station for itself (for example, when the resource reservation-related indication information is from the base station), or a resource reserved by a base station C for a base station D (for example, when the resource reservation-related indication information is from the base station C);

all reserved resources, for example, the union of reserved resources indicated by all resource reservation information acquired by the UE A, and optionally, a resource reserved by the UE for itself.

where:

Optionally, in this case, the resource reservation-related indication information may be from the UE A.

Optionally, the union of the reserved resources indicated by all the resource reservation information acquired by the UE A can be considered as all reserved resources in the resource pool from the perspective of the UE A (that is, unavailable for the resources reserved by the UE A for itself).

Optionally, all the resource reservation information acquired by the UE A may include: resource reservation information acquired by the UE A through a sensing procedure (for example, decoding SCI transmitted by other UE relative to the UE A, performing SL measurement); the resource reservation information acquired by the UE A through step S401 of Embodiment 4 of the present disclosure; and resource reservation information acquired by the UE A in other ways.

Optionally, the resource reserved by the UE A for itself may be a resource reserved by the UE A for itself determined from the remaining resources (i.e., resources not being reserved, or available resources) after excluding the union of the reserved resources indicated by the acquired resource reservation information from all resources of the resource pool.

Frequency domain information of the indicated resource, for example, the start and length of a frequency domain resource, the pattern of the frequency domain resource (e.g., a bitmap), or frequency domain information represented in other manners. The granularity of the frequency domain resource may be a resource block (RB), or may be sub-band, or may be subcarrier, or may be a combination of the above frequency domain resource granularities.

Time domain information of the indicated resource, for example, a start time and a length, a time pattern (e.g., a bitmap), or time domain information expressed in other manners. The granularity of time may be a second, or may be a millisecond, or may be a frame number, or may be a subframe number, or may be a direct frame number, or may be a direct subframe number, or may be a slot number, or may be a symbol number (for example, a symbol number in a slot), or may be a combination of the above time granularities.

Code domain information of the indicated resource.

The type of SL transmission and/or reception performed using the indicated resource, such as one or a plurality of unicast, groupcast, or broadcast.

A physical channel(s) and/or signal(s) for SL transmission and/or reception performed using the indicated resource. For example, the physical channel(s) and/or signal(s) may be one or a plurality of the following:

an SL PSS;
an SL SSS;
a PSBCH;
a PSCCH;
a PSSCH; and
a PSFCH,

Optionally, the resource reservation-related indication information may be included in an RRC message or a PC5 RRC message (for example, an MIB, an SIB, an SL MIB, other RRC message, other PC5 RRC message), or may be included in a MAC CE, or may be included in downlink control information (DCI), or may be included in sidelink control information (SCI).

Optionally, the resource pool indicated by the resource reservation-related indication information may be indicated in an implicit manner, for example, a resource pool currently in use, a resource pool in which the RRC message or the PC5 RRC message or the MAC CE or the DCI or the SCI carrying (or bearing) the resource reservation-related indication information is located, a predefined resource pool, a pre-configured resource pool, or a resource pool determined in other manners. Optionally, in this case, the resource reservation-related indication information may not include a resource pool index and/or a resource pool identity.

Optionally, one or a plurality (where applicable) of the "index of the resource pool where the indicated resource is located," the "identity of the resource pool where the indicated resource is located," the "type of the indicated resource," the "type of SL transmission and/or reception performed by using the indicated resource," and the "physical channel and/or signal for SL transmission and/or reception performed by using the indicated resource" may be an attribute of the resource reservation-related indication information, rather than an attribute of each piece of the resource reservation information. For example, if the resource reservation-related indication information indicates that the "type of SL transmission and/or reception performed by using the indicated resource" is unicast, then the types of all SI, transmission and/or reception performed by using all the reserved resources indicated in the resource reservation-related indication information are unicast.

Optionally, one or a plurality of "the index of the resource pool where the indicated resource is located," "the identity of the resource pool where the indicated resource is located," "the type of the indicated resource," "the type of SI, transmission and/or reception performed by using the indicated resource," or "the physical channel and/or signal for SL transmission and/or reception performed by using the indicated resource" may take a predefined value or a preset value. In this case, the resource reservation-related indication information may not include the one or more pieces of indication information. For example, the "type of the indicated resource" may be predefined as "all reserved resources," in which case the resource reservation-related indication information does not include the "type of the indicated resource."

In addition, at step S402, a reserved resource on an SL is determined according to the resource reservation-related indication information and/or other information.

For example, a reserved resource in a resource pool currently in use is determined.

As another example, a reserved resource in the resource pool indicated (explicitly or implicitly) by the resource reservation-related indication information is determined.

In this way, Embodiment 4 of the present disclosure includes a resource pool index in the resource reservation indication, so that the LIE can flexibly reserve resources in different resource pools, thereby improving the flexibility in resource reservation. In addition, by including resources reserved by a base station or other UE in the reserved resource indication, the UE does not need to correctly decode all SCI transmitted over an air interface to acquire resource reservation conditions on an SL as accurately as possible, thereby greatly reducing collisions in resource reservation.

Embodiment 5

A method performed by user equipment in Embodiment 5 of the present disclosure will be described below with reference to FIG. 5.

Figure 5:
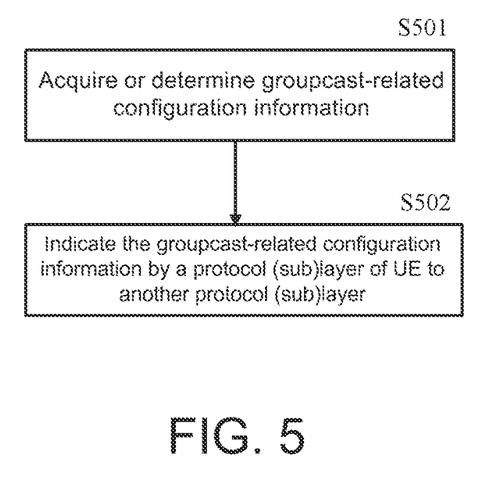
FIG. 5 is a flowchart showing a method performed by user equipment according to Embodiment 5 of the present disclosure.

FIG. 5 is a flowchart showing a method performed by user equipment according to Embodiment 5 of the present disclosure.

As shown in FIG. 5, in Embodiment 5 of the present disclosure, steps performed by the user equipment (UE) include: step S501 and step S502.

Specifically, at step S501, groupcast-related configuration information is acquired or determined.

Where:
The groupcast-related configuration information may include the following:
A maximum group size.
Optionally, the groupcast-related configuration information may be from predefined information, or may be from pre-configuration information of the UE, or may be from default configuration information of the UE, or may be from a base station (for example, a gNB, or an eNB), or may be from another UE.
Optionally, the groupcast-related configuration information may be determined by a protocol layer or protocol sublayer of the UE according to other configuration information. For example, a physical layer or a MAC sublayer of the UE may determine a maximum group size according to HARQ-related configuration information (or pre-configuration information or default configuration information). As another example, an application layer of the UE may determine the maximum group size according to settings of the application layer.
Optionally, the groupcast-related configuration information may be included in an RRC message or a PC5 RRC message (for example, an MIB, an SIB, an SL MIB, pre-configuration information, default configuration information, other RRC message, other PC5 RRC message), or may be included in a MAC CE, or may be included in downlink control information (DCI), or may be included in sidelink control information (SCI).

In addition, at step S502, the groupcast-related configuration information (for example, the maximum group size) is indicated by a protocol layer or protocol sublayer A of the UE to another protocol layer or protocol sublayer B.

Where:
The protocol layer or protocol sublayer A may be a lower layer of the protocol layer or protocol sublayer B, or may be a higher layer (or upper layer) of the protocol layer or protocol sublayer B.
Any one of the protocol layer or protocol sublayer A and the protocol layer or protocol sublayer B may be any one of the following (where applicable):
a physical layer;
a MAC sublayer;
an RLC sublayer;
a PDCP sublayer;
a SDAP sublayer;
an RRC layer;
an AS layer;
a NAS layer;
a V2X layer; and
an application layer.

In this way, Embodiment 5 of the present disclosure includes the maximum group size in the groupcast-related indication, so that the UE can indicate the maximum group size to a higher layer (for example, an application layer, or a layer that establishes and/or manages a group for groupcast communication), thereby ensuring that the size of the established groupcast group does not exceed the maximum group size supported by an underlying protocol.

Embodiment 6

A method performed by user equipment in Embodiment 6 of the present disclosure will be described below with reference to FIG. 6.

Figure 6:
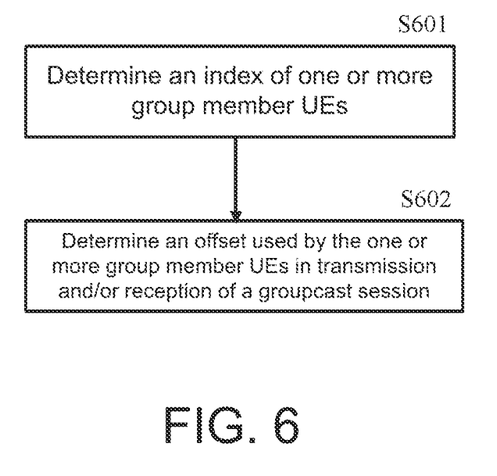
FIG. 6 is a flowchart showing a method performed by user equipment according to Embodiment 6 of the present disclosure.

FIG. 6 is a flowchart showing a method performed by user equipment according to Embodiment 6 of the present disclosure.

As shown in FIG. 6, in Embodiment 6 of the present disclosure, steps performed by the user equipment (VE) include: step S601 and step S602.

Specifically, at step S601, indexes of one or more group member UEs are determined.

Where:
The number of the indexes may be denoted as $S_g$, and the value range of the indexes may be $\{0, 1, \ldots, S_g-1\}$.
Optionally, each of the indexes respectively corresponds to one group member UE, where the group member UE belongs to the same groupcast group. Optionally, the group member UE may include part of receiver UEs in the groupcast group, or may include all of the receiver UEs in the groupcast group, or may include a transmitter UE and part of the receiver UEs in the groupcast group, or may include the transmitter UE and all of the receiver UEs in the groupcast group.
Optionally, the index may be directly included in groupcast-related configuration information. For example, the groupcast-related configuration information includes configuration information of three group member UEs, which includes indexes (for example, the values of which are 0, 1, and 2, respectively) of the three group member UEs.

Optionally, the indexes may also be indirectly determined by the groupcast-related configuration information. For example, the groupcast-related configuration information includes configuration information of three group member UEs (for example, configuration information of a layer-2 UE ID, for example, in the manner of a list), wherein an order of appearance (or inverse order) of the configuration information of each group member UE indicates the value of the index. For example, the index of UE corresponding to the first-occurring configuration information (for example, the first item in the list) is 0, the index of UE corresponding to the second-occurring configuration information (for example, the second item in the list) is 1, and the index of UE corresponding to the last-occurring configuration information (for example, the third item in the list) is 2.

Optionally, the groupcast-related configuration information may be from predefined information, or may be from pre-configuration information of the UE, or may be from default configuration information of the UE, or may be from a base station (for example, a gNB, or an eNB), or may be from another UE.

Optionally, the groupcast-related configuration information may be included in an RRC message or a PC5 RRC message, or may be included in a MAC CE, or may be included in downlink control information (DCI), or may be included in sidelink control information (SCI).

Optionally, the groupcast-related configuration information may be indicated by a protocol layer or a protocol sublayer of the UE (for example, an RRC layer, an AS layer, a NAS layer, a V2X layer, an application layer, a MAC sublayer, an RLC sublayer, a PDCP sublayer, an SDAP sublayer, or other protocol layer, where applicable) to another protocol layer or protocol sublayer (for example, an RRC layer, an AS layer, a NAS layer, a V2X layer, an application layer, a physical layer, a MAC sublayer, an RLC sublayer, a PDCP sublayer, an SDAP sublayer, or other protocol layer, where applicable).

Further, at step S602, an offset used by the one or more group member UEs in transmission and/or reception of a groupcast session is determined according to the index of the respective one or more group member UEs.

For example, the offset used by the one or more group member UEs in transmission and/or reception of the groupcast session may each be equal to the index of the respective group member UE. The offset may be used for determining a position of a resource allocated to the respective group member UE (for example, a time domain resource, a frequency domain resource, a code domain resource) in resources allocated to the groupcast group.

For example, if the UE is a transmitter UE, and the one or more group member UEs are receiver UEs, then the UE may respectively determine, according to the index of the one or more group member UEs, an offset of an HARQ feedback resource (for example, a resource used for transmitting a PSFCH) of the respective group member UE, such as an offset of one or a plurality of a time domain resource, a frequency domain resource, or a code domain resource. For example, if indexes of two receiver UEs (denoted as UE 0 and UE 1) are respectively 0 and 1, then a PSFCH, transmitted by the UE 0 is received on an HARQ feedback resource having a corresponding offset of 0, and a PSFCH transmitted by the UE 1 is received on an HARQ feedback resource having a corresponding offset of 1.

As another example, if the UE is a receiver UE, then the UE may determine, according to the index of the one or more group member UEs, an offset of an HARQ feedback resource of its own (e.g., a resource for transmitting a PSFCH), such as an offset of one or a plurality of a time domain resource, a frequency domain resource, or a code domain resource. For example, if the index of the UE is 1, then the PSFCH is transmitted on an HARQ feedback resource having a corresponding offset of 1.

In this way, Embodiment 6 of the present disclosure includes an index of one or more group member UEs in the groupcast-related indication, so that a transmitter UE (for example, a physical layer of the UE) and a receiver UE (for example, a physical layer of the UE) in a groupcast session do not need to exchange any information in an underlying protocol to uniquely determine an indicated resource offset (for example an offset of an HARQ feedback resource) of each receiver UE, greatly increasing the efficiency of resource configuration in the groupcast.

Embodiment 7

A method performed by user equipment in Embodiment 7 of the present disclosure will be described below with reference to FIG. 7.

Figure 7:
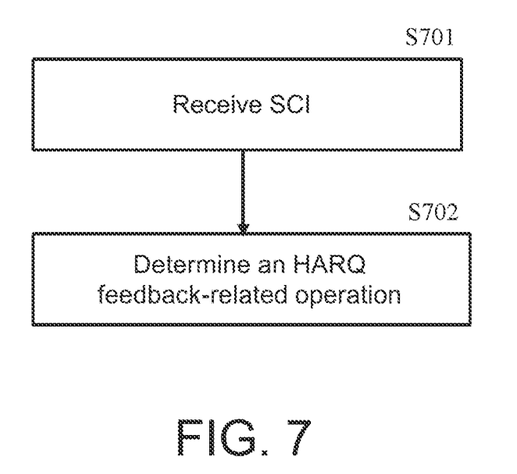
FIG. 7 is a flowchart of a method performed by user equipment according to Embodiment 7 of the present disclosure.

FIG. 7 is a flowchart of a method performed by user equipment according to Embodiment 7 of the present disclosure.

As shown in FIG. 7, in Embodiment 7 of the present disclosure, steps performed by the user equipment (UE) include: step S701 and step S702.

Specifically, at step S701, sidelink control information (SCI) is received.

For example, SCI transmitted by a transmitter UE in a groupcast session is received. The SCI may indicate one or more pieces of HARQ feedback-related information, each of which may be any one of the following:
  the transmitter UE does not successfully receive HARQ feedback of any UE in a UE set A;
  the transmitter UE has successfully received HARQ feedback of all UEs in the UE set A;
  the transmitter UE requests (or requires, or instructs) all the UEs in the UE set A to transmit HARQ feedback; and
  the transmitter UE requests (or requires, or instructs) all the UEs in the UE set A to not transmit HARQ feedback.
where:
Optionally, the LYE set A may correspond to one or more group member UEs.
Optionally, the UE set A may be indicated in any of the following manners:
one or more integer lists, wherein each integer in each list represents an index of one group member UE;
one or more bitmaps, wherein each bit in each bitmap represents an index of one group member UE;
one or more integer ranges (for example, represented by the minimum and maximum values of the integer range), wherein each integer in each integer range represents an index of one group member UE; and
other manners to indicate one or more integers.
Optionally, the HARQ feedback may be feedback for a transport block in an HARQ process indicated by the SCI (for example, a transport block scheduled by the SCI), or may be for a transport block determined in other manners. For example, the transport block scheduled by the SCI may be initial transmission of the transport block; in this case, the transmitter UE may require only part of receiver UEs in the groupcast session to transmit HARQ feedback (e.g., due to the limitation of the number of HARQ resources). As another example, the transport block scheduled by the SCI may be retransmission of the transport block; in this case, the transmitter UE may require only part of receiver UEs in the groupcast session to transmit HARQ feedback, for example, when the transmitter UE does not correctly receive HARQ feedback of the part of receiver UEs.

In addition, at step S702, an HARQ feedback-related operation is determined according to the SCI. For example, a determination is made as to whether to transmit HARQ feedback.

For example, if the UE is in the UE set A and the SCI indicates that "the transmitter UE has not received HARQ feedback of any UE in the UE set A" or "the transmitter UE requests (or requires, or instructs) all the UEs in the UE set A to transmit HARQ feedback," then the UE may determine that HARQ feedback needs to be transmitted.

As another example, if the UE is in the UE set A and the SCI indicates that "the transmitter UE has successfully received HARQ feedback of all the UEs in the UE set A" or "the transmitter UE requests (or requires, or instructs) all the UEs in the UE set A to not transmit HARQ feedback," then the UE may determine that HARQ feedback does not need to be transmitted.

In this way, Embodiment 7 of the present disclosure indicates in the SCI HARQ feedback of which receiver UE has been received by the transmitter UE, so that a large groupcast group can be supported by using less HARQ feedback resources in a groupcast session, and unnecessary retransmission of HARQ feedback by the receiver UE is greatly reduced, thereby improving the resource utilization efficiency of groupcast communication.

Variational Embodiment

Figure 8:
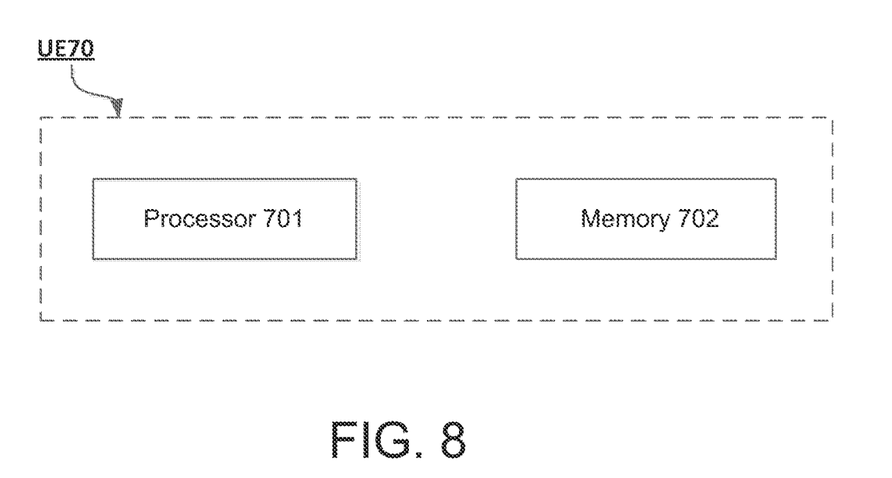
FIG. 8 is a block diagram schematically showing user equipment related to the present disclosure.

Hereinafter, FIG. 8 is used to illustrate user equipment that can perform the method performed by user equipment described in detail above in the present disclosure as a variant embodiment. FIG. 8 is a block diagram showing user equipment (UE) related to the present disclosure.

As shown in FIG. 8, the user equipment (UE) 70 includes a processor 701 and a memory 702. The processor 701 may include, for example, a microprocessor, a microcontroller, an embedded processor, and the like. The memory 702 may include, for example, a volatile memory (such as a random access memory (RAM)), a hard disk drive (HDD), a non-volatile memory (such as a flash memory), or other memories. The memory 702 stores program instructions. The instructions, when run by the processor 701, can perform the above method performed by user equipment described in detail in the present disclosure.

The methods and related devices according to the present disclosure have been described above in conjunction with preferred embodiments. It should be understood by those skilled in the art that the methods shown above are only exemplary, and the above-described embodiments can be combined with one another as long as no contradiction arises. The method according to the present disclosure is not limited to steps or sequences shown above. The network node and the user equipment illustrated above may include more modules for example, they may further include modules which can be developed or developed in the future to be applied to modules of a base station, an MME, or UE. Various identifiers shown above are only exemplary, not for limitation, and the present disclosure is not limited to specific information elements serving as examples of these identifiers. Those skilled in the art can make various alterations and modifications according to the teachings of the illustrated embodiments.

It should be understood that the above embodiments of the present disclosure may be implemented through software, hardware, or a combination of software and hardware. For example, various components of the base station and user equipment in the above embodiments can be implemented by multiple devices, and these devices include, but are not limited to: an analog circuit device, a digital circuit device, a digital signal processing (DSP) circuit, a programmable processor, an application specific integrated circuit (ASIC), a field programmable gate array (FPGA), and a complex programmable logic device (CPLD), and the like.

In this application, the "base station" may refer to a mobile communication data and control exchange center with large transmission power and a wide coverage area, including functions such as resource allocation and scheduling, data reception and transmission. "User equipment" may refer to a user mobile terminal, for example, including terminal devices that can communicate with a base station or a micro base station wirelessly, such as a mobile phone, a laptop computer, and the like.

In addition, the embodiments of the present disclosure disclosed herein may be implemented on a computer program product. More specifically, the computer program product is a product provided with a computer-readable medium having computer program logic encoded thereon. When being executed on a computing device, the computer program logic provides related operations to implement the above-described technical solutions of the present disclosure. When being executed on at least one processor of a computing system, the computer program logic enables the processor to perform the operations (methods) described in the embodiments of the present disclosure. Such an arrangement of the present disclosure is typically provided as software, code, and/or other data structures that are configured or encoded on a computer-readable medium, such as an optical medium (for example, a CD-ROM), a floppy disk, or a hard disk, or other media such as firmware or microcode on one or more ROM or RAM or PROM chips, or downloadable software images, shared database and so on in one or more modules. Software or firmware or such configuration may be installed on a computing equipment such that one or more processors in the computing equipment perform the technical solutions described in the embodiments of the present disclosure.

In addition, each functional module or each feature of the base station device and the terminal device used in each of the above embodiments may be implemented or executed by a circuit, which is usually one or more integrated circuits. Circuits designed to execute various functions described in this description may include general-purpose processors, digital signal processors (DSPs), application specific integrated circuits (ASICs) or general-purpose integrated circuits, field programmable gate arrays (FPGAs) or other programmable logic devices, discrete gates or transistor logic, or discrete hardware components, or any combination of the above. The general-purpose processor may be a microprocessor; or the processor may be an existing processor, a controller, a microcontroller, or a state machine.

The above-mentioned general purpose processor or each circuit may be configured with a digital circuit or may be configured with a logic circuit. In addition, when an advanced technology that can replace current integrated circuits emerges because of advances in semiconductor technology, the present disclosure may also use integrated circuits obtained using this advanced technology.

Although the present disclosure has been shown in connection with the preferred embodiments disclosed herein, it will be understood by those skilled in the art that various modifications, substitutions, and alterations may be made therein without departing from the spirit and scope of the present disclosure. Accordingly, the present disclosure should not be defined by the above-described embodiments, but should be defined by the appended claims and their equivalents.

The invention claimed is:

1. A method performed by a user equipment (UE), the method comprising:
   receiving, from another UE, sidelink control information (SCI) which contains a 2-bit indication of a cast type, wherein the 2-bit indication indicates which one of three different cast types is the cast type of a sidelink transmission scheduled by the SCI;
   determining, based on the 2-bit indication, the cast type of the sidelink transmission scheduled by the SCI, as one of the three different cast types, wherein the three different cast types are Broadcast, Groupcast, and Unicast;
   causing a physical layer to indicate the determined cast type to a medium access control (MAC) layer.

2. A user equipment (UE), comprising:
   a processor; and
   a memory storing instructions, wherein the instructions stored in the memory are executable by the processor to:
      receive, from another UE, sidelink control information (SCI) which contains a 2-bit indication of a cast type, wherein the 2-bit indication indicates which one of three different cast types is the cast type of a sidelink transmission scheduled by the SCI; and
      determine, based on the 2-bit indication, the cast type of the sidelink transmission scheduled by the SCI, as one of the three different cast types, wherein the three different cast types are Broadcast, Groupcast, and Unicast;
      cause a physical layer to indicate the determined cast type to a medium access control (MAC) layer.

* * * * *